US012692174B2

(12) United States Patent
Zou et al.

(10) Patent No.: US 12,692,174 B2
(45) Date of Patent: Jul. 28, 2026

(54) PROCESS TO PRODUCE CATHODE MATERIALS FOR RECHARGEABLE LI BATTERIES

(71) Applicant: Tesla, Inc., Austin, TX (US)

(72) Inventors: Feng Zou, Mississauga (CA); Yang Liu, Mississauga (CA)

(73) Assignee: Tesla, Inc., Austin, TX (US)

( * ) Notice: Subject to any disclaimer, the term of this patent is extended or adjusted under 35 U.S.C. 154(b) by 833 days.

(21) Appl. No.: 17/632,776

(22) PCT Filed: Sep. 11, 2020

(86) PCT No.: PCT/US2020/050485
§ 371 (c)(1),
(2) Date: Feb. 3, 2022

(87) PCT Pub. No.: WO2021/050935
PCT Pub. Date: Mar. 18, 2021

(65) Prior Publication Data
US 2022/0274847 A1    Sep. 1, 2022

Related U.S. Application Data

(60) Provisional application No. 62/899,677, filed on Sep. 12, 2019.

(51) Int. Cl.
*C01G 53/44* (2025.01)
*H01M 4/02* (2006.01)
(Continued)

(52) U.S. Cl.
CPC ............ *C01G 53/44* (2013.01); *H01M 4/505* (2013.01); *H01M 4/525* (2013.01);
(Continued)

(58) Field of Classification Search
CPC ..... C01G 53/42; C01G 53/44; C01P 2004/03; C01P 2006/12; H01M 10/0525;
(Continued)

(56) References Cited

U.S. PATENT DOCUMENTS 5,824,283 A    10/1998  Babjak et al.
2012/0028128 A1    2/2012  Seino et al.
(Continued)

FOREIGN PATENT DOCUMENTS

EP           3 312 913 A1    4/2018
JP       2010-245019 A    10/2010
(Continued)

OTHER PUBLICATIONS

International Search Report and Written Opinion dated Jan. 12, 2021 in application No. PCT/US2020/050485.

*Primary Examiner* — Minh N Trinh
(74) *Attorney, Agent, or Firm* — Knobbe, Martens, Olson & Bear, LLP

(57)                ABSTRACT

This invention provides a method for the production of high capacity cathode materials for use in rechargeable lithium batteries. Traditional methods for producing lithium mixed metal oxide cathode materials typically generate large amounts of effluent which effluent must be treated prior to discharge. The present process uses mixed metals as raw materials in a wet chemical reaction in order to make high-quality precursors which can be used to prepare high-quality cathode materials after lithiation. As a key feature, in the precursor preparation process, the bulk of the aqueous solution used for the wet chemical reaction is recycled back to the reactor, so that the total process has little or no effluent generated during production of the cathode precursor material.

25 Claims, 3 Drawing Sheets

(51) Int. Cl.
  *H01M 4/505*        (2010.01)
  *H01M 4/525*        (2010.01)
  *H01M 10/0525*      (2010.01)

(52) U.S. Cl.
  CPC ..... *H01M 10/0525* (2013.01); *C01P 2004/03*
            (2013.01); *H01M 2004/028* (2013.01)

(58) Field of Classification Search
  CPC .......... H01M 2004/028; H01M 4/366; H01M
                        4/505; H01M 4/525
  See application file for complete search history.

(56)                    References Cited

U.S. PATENT DOCUMENTS

| | | | |
|---|---|---|---|
| 2018/0167224 A1 | 6/2018 | Brandt | |
| 2019/0020025 A1 | 1/2019 | Matsumoto et al. | |
| 2022/0274847 A1 * | 9/2022 | Zou ....................... | C01G 53/42 |
| 2023/0174380 A1 * | 6/2023 | Luetkens, Jr. .......... | C01B 25/45 |
| | | | 429/231.95 |
| 2023/0331570 A1 * | 10/2023 | Chen ...................... | C01D 15/00 |
| 2024/0400411 A1 * | 12/2024 | Luetkens, Jr. ...... | H01M 4/0471 |

FOREIGN PATENT DOCUMENTS

| | | | |
|---|---|---|---|
| JP | 2010-245039 | 10/2010 | |
| WO | WO 2007/094645 A1 | 8/2007 | |
| WO | WO 18/113506 | 6/2018 | |
| WO | WO 18/167224 | 9/2018 | |
| WO | WO-2024044008 A1 * | 2/2024 | ............ H01M 4/136 |

* cited by examiner

S-4800 5.0kV 5.7mm x18.0k                    3.00um

PROCESS TO PRODUCE CATHODE MATERIALS FOR RECHARGEABLE LI BATTERIES

INCORPORATION BY REFERENCE TO ANY PRIORITY APPLICATIONS

This application claims the benefit of priority to U.S. Prov. App. No. 62/899,677, filed Sep. 12, 2019, which is incorporated by reference herein in its entirety for all purposes.

BACKGROUND

Field

This invention relates to a method for producing cathode materials for rechargeable lithium (Li) batteries, and cathode materials made by the method. In particular, the provided method relates to relatively effluent free production of such cathode materials when compared to incumbent industrial methods.

Description of the Related Art

Rechargeable Li-ion batteries have been used in a number of different types of devices as an energy storage component. These devices include mobile-phones, portable computers, wireless power tools, hybrid and pure electric automobiles, and the like. In recent years, the demand for higher-output Li-ion batteries has increased dramatically especially with the rapid market growth of electric automobiles. The major components in a lithium-ion battery include an anode, a cathode, and electrolyte. During its charge and discharge cycles, lithium ions are shuttled between the anode and cathode active materials through the electrolyte. Due to its limited specific-capacity, and its high cost of production and raw materials, the cathode active material is usually the most expensive component in the Li-ion batteries. Therefore, selection of the cathode active material is an important step for improving the performance of, and lowering the cost of, Li-ion batteries.

Currently, lithium mixed metal oxides, which contain mostly nickel, cobalt, manganese, and/or aluminum with other necessary dopants, are the main components used for the production of cathode active materials with high performance. The demand and production of such materials continues to increase significantly.

Incumbent industrial methods to produce these high performance cathode materials, such as lithium mixed metal oxides, includes two major steps. The first step is a precursor production step and the second step is a lithiation step. The precursor step starts with the use of mixed metal sulphates, which are dissolved in water to form an aqueous solution. However, these processes can release undesirable effluent.

SUMMARY

The advantages set out hereinabove, as well as other objects and goals inherent thereto, are at least partially or fully provided by the process of the present invention, as set out herein below.

One embodiment of the present invention is a process for producing cathode material for a battery, such as a lithium-ion battery, which process would reduce the amount of toxic or dangerous effluent from the currently known processes for making lithium mixed metal oxide. As such, it would be desirable to provide a suitable process having little or no effluent generation. In one embodiment, the process provides a system wherein essentially the entire liquid portion from the reaction is, or can be, recycled completely to the reaction system, without any significant treatment. Additionally, the process may require little or no need to evaporate water and/or decompose organics or nitrates during a final high temperature treatment/calcination process.

One embodiment is a method of producing a cathode active material. This method includes providing an aqueous solution with a pH of greater than 7; adding a first metal to the aqueous solution to form a reaction solution, wherein the first metal is selected from the group consisting of nickel, manganese, cobalt, aluminum, magnesium and combinations thereof; forming a product solution comprising the steps of adding an oxidant and a second metal to the reaction solution, wherein the second metal is selected from at least two elements from the group consisting of nickel, manganese, cobalt, aluminum, magnesium, zirconium, yttrium, titanium, vanadium, molybdenum and combinations thereof, wherein the product solution comprises a cathode active material precursor, and wherein the cathode active material precursor product comprises the first metal and the second metal, wherein the first metal and second metal are not the same; and isolating the cathode active material precursor from at least a portion of the product solution and thereby forming a filtrate solution.

Another embodiment provides a chemical process to produce lithium mixed metal oxide as cathode active materials for use in rechargeable lithium batteries. The process includes two major steps, namely, a wet chemical process for fabricating a precursor, and a solid-state reaction, called "lithiation", for making the final cathode materials.

One embodiment of the present invention provides a process to produce lithium mixed metal oxide as cathode active materials for use in the production of lithium ion batteries using two major steps, a precursor preparation step and lithiation step, wherein:

A) in the precursor preparation step, selected metals in their metallic form are added to an agitated reaction system containing a mixture of solid metal particles and mixed metal hydroxide particles in an aqueous solution, together with selected oxidant or oxidants and selected metal nitrates, and nitric acid, which are also introduced into the reactor, to effect oxidation of the metal particles, under alkaline conditions, wherein the overall oxidation reaction is represented by the following equation:

$$x\text{Me} + y\text{Me}'(\text{NO}_3)_n + z\text{HNO}_3 + (0.25xm - 2yn - 2z)\text{O}_2 + \\ (0.5xm + 2yn + z)\text{H}_2\text{O} \rightarrow \text{Me}_x\text{Me}'_y(\text{OH})_{(xm+yn)} + \\ (yn+z)\text{NH}_3$$

where Me represents at least one metal in metallic form, selected from a group consisting of nickel, manganese, cobalt, aluminum, and magnesium; Me' represents at least one metal in their ionic form selected from a group consisting of nickel, manganese, cobalt, aluminum, magnesium, zirconium, yttrium, titanium, vanadium, and molybdenum; $\text{Me}_x\text{Me}'_y(\text{OH})_{(xm+yn)}$ represents the precursor product; x and y are the mole fraction of the metals Me and Me', respectively, m is the mole weighted average chemical valence of the mixed metals Me in the precursor product, n is the mole weighted average chemical valence of the mixed metals Me' in ionic form in the reactants, z is the mole fraction of $\text{HNO}_3$ introduced into the reaction system; $xm \geq 8yn + 8z$, $x+y=1$, $1 \geq x > 0$, $y \geq 0$, $z \geq 0$, and wherein a resultant slurry from the oxidation reaction is taken from the reactor, the unreacted raw metals are removed from the slurry and recycled to the reaction system with or without reactivation treatment using nitric acid and/or a combination of nitric acid and ammonia/ammonium, and a solid and liquid separation is carried out afterwards, in which the solid material collected is used as the precursor product and the liquid material is recycled directly to the reaction system without any treatment, and B) a lithiation step, wherein the collected precursor product is mixed with lithium containing compounds, and optionally other dopants, to produce a final mixture, followed by calcining the final mixture to obtaining the cathode active material.

In one embodiment, raw materials which may be mostly in metallic form, are introduced into a reaction system. The reaction system typically comprises at least one agitated mixing tank, and reactors, which may be provided with magnetic separation devices in order to remove and recycle the unreacted raw materials. In order to keep raw material active during the reaction, a reactivation step may be provided before recycling the unreacted raw materials. Oxidants, such as oxygen and/or nitrate, are introduced into the reaction system to effect oxidation of the metals. A solid and liquid separation operation is conducted after the reaction. The liquid portion may be recycled to the reaction system and the solid portion is collected as the precursor material. An artificial solution, with essentially the same or similar compositions as the said filtrate, may be prepared and used for the start-up of the reaction until a suitable filtrate is generated from the filtration system and then recycled to reaction system.

In the lithiation stage, the final cathode active materials are obtained by mixing the precursor materials produced hereinabove, with lithium containing compounds, and optionally other dopants, and then performing a calcination treatment, followed by additional surface treatments if required.

Embodiments of the present invention thus provide a system and process for making lithium mixed metal oxides, while having little or no effluent generation. That is, the system may allow essentially the entire liquid portion from the reaction to be recycled completely to the reaction system, without any treatment.

In an additional feature, the process of the present invention can be conducted in a batch process, but may also be conducted in an essentially continuous process, as will be described hereinbelow.

In another embodiment, the present invention also provides a cathode material precursor product, wherein suitable cathode material precursors are produced, and wherein these precursors are produced in a steady, continuous process in a single stage reaction system, in the manner described herein. This embodiment also comprises the final cathode active materials, when produced by the process described herein, with respect to the present invention, and the cathodes produced therefrom.

In a third aspect, the present invention also provides a battery, wherein the cathode of the battery is produced by the chemical process hereinabove described, with respect to embodiments of the present invention.

BRIEF DESCRIPTION OF THE DRAWINGS

Embodiments will now be demonstrated by use of the following non-limiting examples, and by reference to the attached figures where.

Figure 1:
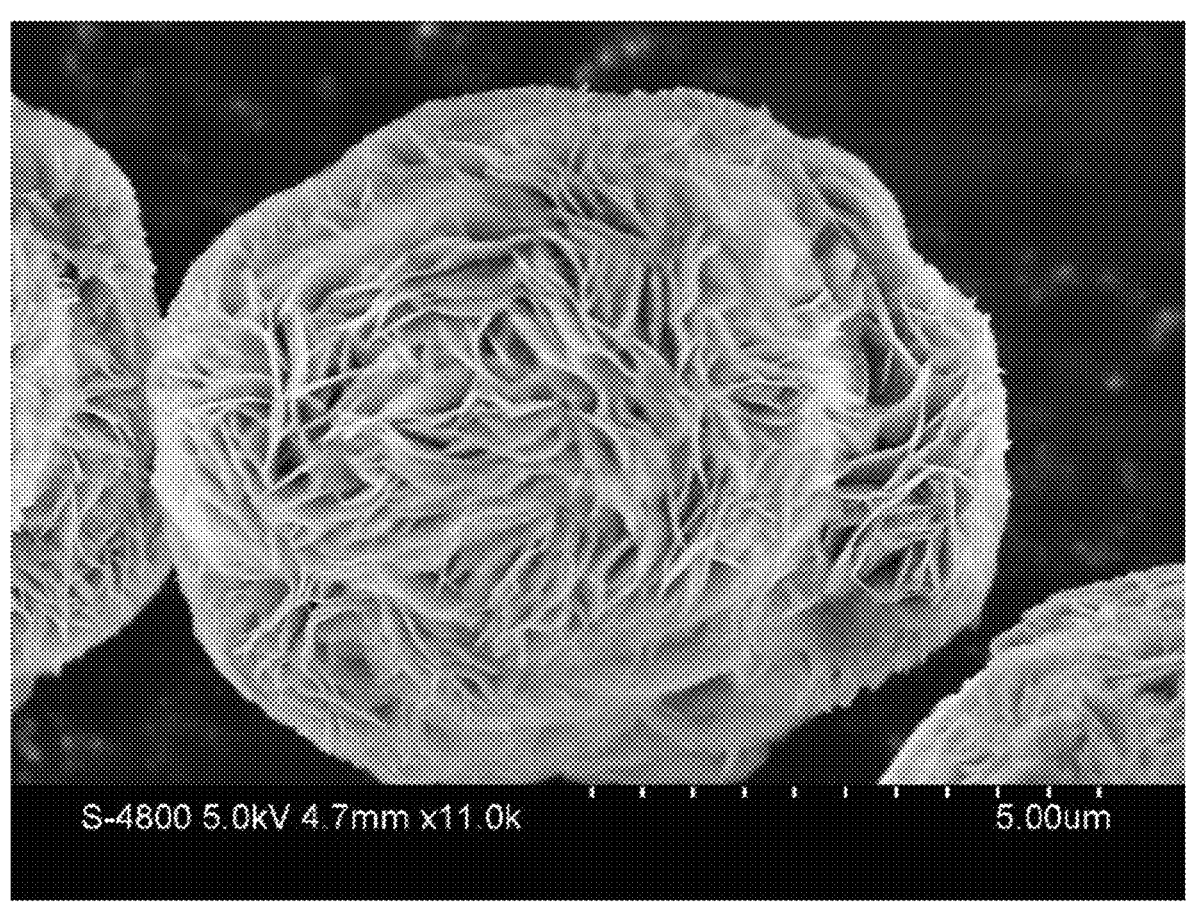
FIG. 1 is an SEM image of the sample collected from Example 1 with nitrate and acetate as anions in the reaction system.

It will be clearly understood though, that the examples and figures are for illustrative purpose only, and are not necessarily restrictive of the scope of the present invention.

DETAILED DESCRIPTION

Embodiments relate to a process for the production of cathode material for an energy storage device, and a lithium-ion battery in particular, wherein the process ameliorates and/or resolves effluent issues typically associated with fabricating lithium metal oxides. As such, the process described generates little or no effluent, and wherein essentially the entire liquid portion from the reaction may be recycled completely back into the reaction system without any significant treatment. Such a system is further advantageous because there is little or no need to evaporate water and/or decompose organics or nitrates during a final high temperature treatment/calcination process.

It is well-known that metal oxides or hydroxides can be formed from corrosion processes, e.g. metal oxidation in an aqueous solution or under moisture conditions. This principle may be used in the first step to produce the precursor materials from pure metals, in which metal corrosion/oxidation reactions, and the co-precipitation reactions, occur simultaneously inside the same reactor. The overall reaction is shown as following equation:

$$x\text{Me} + y\text{Me}'(\text{NO}_3)_n + z\text{HNO}_3 + (0.25xm - 2yn - 2z)\text{O}_2 +$$
$$(0.5xm + 2yn + z)\text{H}_2\text{O} \rightarrow \text{Me}_x\text{Me}'_y(\text{OH})_{(xm+yn)} +$$
$$(yn+z)\text{NH}_3$$

where Me represents at least one metal, preferably in metallic form, selected from the group consisting of nickel, manganese, cobalt, aluminum, and magnesium; Me' represents at least one metal, preferably in their ionic form, selected from the group consisting of nickel, manganese, cobalt, aluminum, magnesium, zirconium, yttrium, titanium, vanadium, and molybdenum; $\text{Me}_x\text{Me}'_y(\text{OH})_{(xm+yn)}$ represents the precursor product; x and y are the mole fraction of the metals Me and Me', respectively, wherein m is the mole weighted average chemical valence of the mixed metals Me in the precursor product, n is the mole weighted average chemical valence of the mixed metals Me' in ionic form in the reactants, and z is the mole fraction of $\text{HNO}_3$ introduced into the reaction system; and wherein $xm \geq 8yn + 8z$, $x+y=1$, $1 \geq x > 0$, $y \geq 0$, and $z \geq 0$.

Oxygen may be used as an oxidant, since if used, it will typically not produce any significant by-products during the reaction. The oxygen can either be provided as a pure oxygen source and/or as oxygen contained in other gases, e.g. oxygen in air.

Some metal nitrates may be included for use with elements which are not easily reacted with oxygen, or for elements which are not easily handled during processing operations, such as during agitation for uniform mixing, or during magnetic separation of their metallic form.

Nitric acid can be used as an additional oxidant, as well as for baffle purposes, in order to slow down the co-precipitation reaction of metal nitrate. Nitrate acid or its combination with ammonia can also be used for reactivation of the recycled raw materials. Ammonia is the only by-product when nitrate and nitric acid is used. However, the ammonia produced is in its gaseous form and will not stay in the reaction system during the operation. Therefore, in the wet chemical process described above for making the precursor, there are no additional or new chemicals added to the liquid after the solid and liquid separation has occurred. As such, the liquid can be directly recycled, up to at least 75%, and more preferably, up to at least 90%, and still more preferably, up to 100%, to the reaction system without any adverse effects on the overall reaction.

The generated ammonia gas can be collected as a useful chemical or chemical precursor for other industries, such as, for example, the fertilizer industry.

To obtain a high-quality product with consistent properties, the presently described reaction may be operated in a continuous mode, in which the reaction will reach a steady-state condition. This provides for better control of the resultant chemical compositions. In one approach, an artificial solution with the same or similar compositions as the liquid in reaction system, is prepared and used for the start-up of the reaction, and this artificial solution is used until the liquid generated from the solid and liquid separation operation, is similar to the artificial solution.

The pH of the reacting slurry may be in the range of 7.5 to 13, or alternatively in the range of 8 to 12. The pH of the solution can be adjusted by adding either an acid selected from sulphuric acid, nitric acid, or acetic acid and/or by adding an alkaline material selected from lithium hydroxide or oxide, sodium hydroxide or oxide, potassium hydroxide or oxide, and ammonia. The pH adjustment may be done by adding an acid such as sulphuric acid or nitric acid, and/or by adding an alkaline material, such as lithium hydroxide, or sodium hydroxide, to the reaction mixture. It should be noted that lower pH values may cause low quality of the co-precipitation product while higher pH values may cause passivation of metals during the corrosion reaction.

The reaction temperature may be in the range of from 20° C. to the boiling point of the reacting slurry, including from 20° C. to 100° C.

Maintaining acceptable electrical conductivity of the reacting system can also be important for control of the corrosion reactions. Therefore, the reacting slurry may also contain dissolved salts to form an electrolyte for conductivity. The salts may include salts such as sulphate salts, acetate salts, nitrate salts, chloric salts, and the like, with cations selected from sodium, lithium, potassium, and ammonium. The salts may be reusable within the recycled liquid collected after the liquid and solid separation.

To make a final lithiated material having good performance, e.g. high capacity, the precursor material may have small primary particles in each secondary particle, i.e. high BET (Brunauer-Emmett-Teller) surface area. When a nitrate is used as the oxidant, and/or doping elements are required, the nitrate generally should exist in the reaction system. The chemical reactions, including metal dissolution and precipitation, should therefore proceed well with only a nitrate as the anion, in the reaction system. However, the BET surface area of the precursor material is normally extremely low with only nitrate in the reaction system. To increase the BET surface area, at least one additional selected anion and/or additives can be applied to the reaction system, which may change the pattern of precursor particle growth. These additional anions may be selected from borate, bromide, iodide, chloride, sulphate, formate, acetate, or the like. Considering that the impurity level in final product might increase when more anions and/or additives are introduced to the reaction system, i chemicals may be selected which are decomposable during the high temperature lithiation process, such as acetates and the like.

Ammonium generally must exist in the reaction system as a cation. However, to adjust pH and conductivity, other cations can also be applied to the reaction system. Considering that the impurity level might be increased in the final product when more cations are introduced into the reaction system, the lithium ion may be selected as the cation, which is the major component in the final product. The aqueous solution may include at least one additional cation beside ammonium, such as sodium, potassium, lithium, and the like. The lithium ion may be selected as the cation which is the major component in the final product.

The reacting slurry may also typically contain dissolved complexing agents, such as a mixture of ammonia and ammonium, which can chelate with the metal ions in the aqueous solution. The overall function of these complexing or chelating agents are to control the properties of the co-precipitation products and to make the metals active for the corrosion reaction.

The method for producing cathode materials can also include a step wherein the unreacted raw metals collected from the slurry, by for example, a magnetic separation step, may be reactivated, by for example, milling and/or washing by using nitrate acid, or its combination with ammonia.

Further, the method can also include a step wherein solid particles with the same or similar compositions as the precursor product, but with a smaller particle size than the precursor product, are introduced into the reaction system at the beginning of the reaction, and/or during the reaction.

Embodiments of the process described herein can thus be used to produce compositionally similar particles of cathode material precursors with uniform elemental distribution inside of each particle, wherein the metals are added in a steady, continuous process in a single stage reaction system. The process can, however, also be applied to produce particles with non-uniform elemental distribution inside each particle, such as compositionally gradient or layered particles of cathode material precursors in a multi-stage reaction system, by adding different metals at different times or different stage. In such a multi-stage system, each stage can deposit a layer of materials with varied composition for different functions. For example, the core area of the cathode material particle can be nickel rich for higher capacity, while the surface area might be manganese, cobalt, magnesium, Tungsten or aluminum rich for stable interface with the electrolyte found in a lithium ion battery.

Thus, embodiments of the process provide a system wherein the metals are added continuously at the same ratio at all times to produce a precursor with uniform element distribution in each particle, or the metals are added continuously at different ratios with time, in order to produce a precursor having non-uniformed element distribution in each particle.

The final cathode active materials produced in the present invention, may then be finally obtained by mixing the precursor compounds with lithium containing compounds, and performing a calcination reaction, which can be optionally followed by surface treatment, if required. This process is normally called lithiation, and this lithiation process is typically conducted as a solid-state reaction at temperatures between 600° C. and 1100° C., depending on the chemical composition of the final materials. In the lithiation reaction step, oxidation condition may also be required as part of the process. Air, oxygen and nitrate may be used as the oxidants.

In the majority of applications, lithium hydroxide, with or without crystallized water, and lithium carbonate may be used as the lithium source.

After lithiation, slight crushing/milling can be required in a size reduction operation, in order to break the loose agglomerates formed during the lithiation step. Then, optional surface treatments, such as washing to remove extra lithium hydroxide/carbonate and other impurities as well as coating are sometimes needed or desired, for stabilizing the surface of the material.

As such, the cathode material can be subjected to further treatment after calcination, and which further treatment includes washing for removal of extra lithium and other unnecessary impurities, and coating of said cathode material for better performance of the cathode material during battery production and/or battery application.

EXAMPLES

Example 1

In accordance with the production process described above, an aqueous solution of about 2.2 L aqueous solution was prepared and transferred into a 3 liter reaction vessel with an agitation and heating systems. The aqueous solution contained about 1.0 M concentration of sodium acetate, 0.2 M concentration of sodium nitrate, and 0.1 M concentration of ammonium nitrate. The solution was agitated at a stir speed of about 800 rpm, while the solution was heated to a temperature of about 60° C. The pH was adjusted and controlled to about 10 by adding a 28% ammonia solution and sodium hydroxide. About 100 grams of metallic nickel was added into the reaction vessel. After about 30 minutes, about 50 grams of ball-milled metal hydroxide powder was added into the reaction vessel as seeds. The metal hydroxide powder with a size of D50 below 1 μm contained mostly nickel and a small amount of cobalt and manganese.

Nitric acid with a concentration of 68% was introduced into the reaction vessel continuously with a peristaltic pump, and 11 grams of metal powders with Ni:Co:Mn of 90:5:5 were manually introduced into the reaction vessel every hour. The pumping rate of nitric acid was about 2.8 mL/hr. The pumping rate was about 10% less than theoretical value required to react all the metals. This was because oxygen was sucked into the reaction system with the agitation setup during the reaction, and the oxygen also participated the reaction as another oxidant.

Every four hours, about 200 mL of the slurry from the reaction vessel was collected, and a magnetic separation was made on the collected slurry. The magnetic portion from the separation was returned to the reaction vessel. The non-magnetic solid portion was filtered, and then washed with water. All the filtrate, together with the wash water, was returned to the reaction vessel.

The operations described above were repeated continuously for three days. The final solid portion from the filtration step, as the precursor for the present invention, was dried at about 120° C. for about five hours or more. This solid sample was sent out for Scanning Electron Microscope (SEM) and BET surface area tests. FIG. 1 shows an SEM image of the sample collected, over precursor particles, from above described reaction. The particle is smooth spherical with fine secondary particles. The BET surface area was about 17 m²/g.

Example 2 (Comparison)

Figure 2:
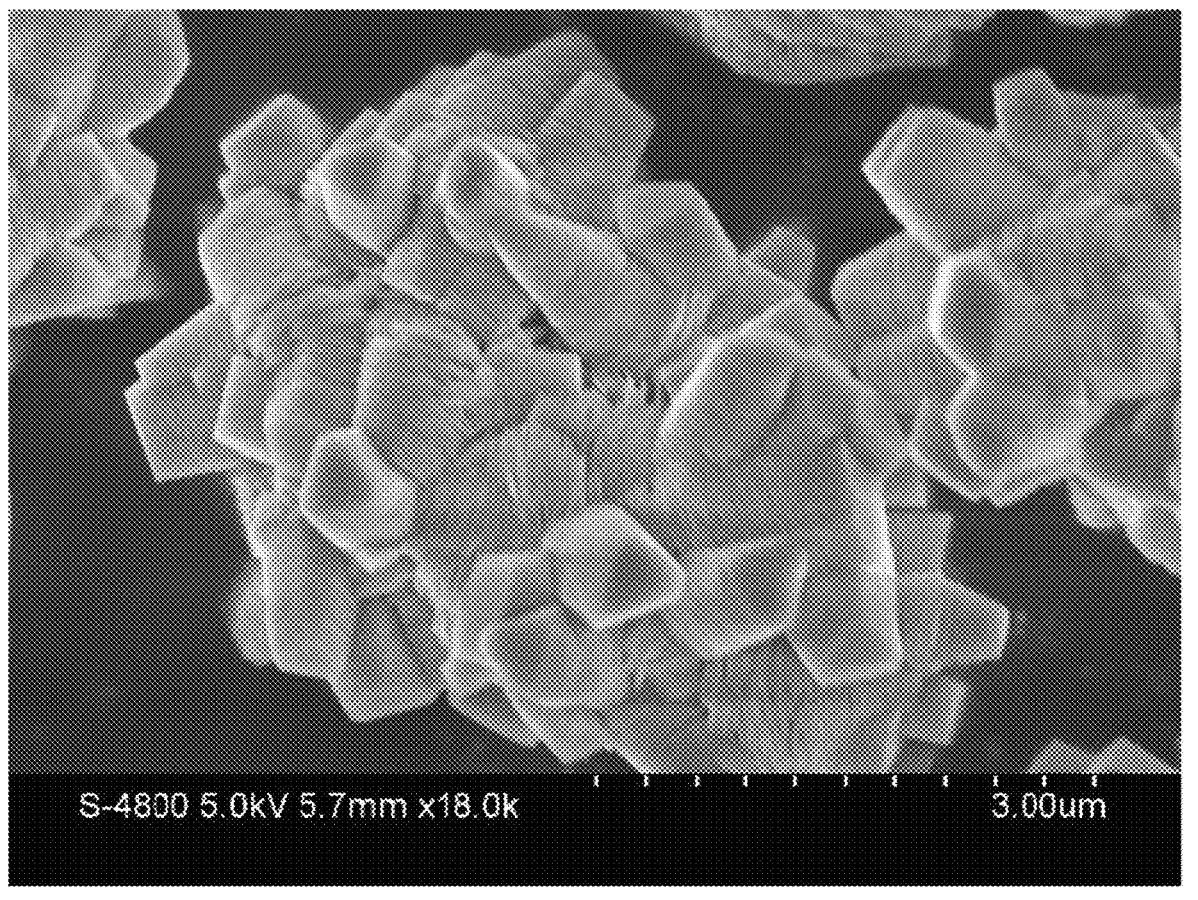
FIG. 2 is an SEM image for the sample collected from Example 2 with only nitrate as anions in the reaction system.

For comparison purposes, a second experiment was conducted in which the reaction conditions were similar to those described in example 1. The only significant difference was that the aqueous solution contained only nitrate as the anion in the reaction system, i.e. about 1.2 M concentration of sodium nitrate and 0.1 M concentration of ammonium nitrate. FIG. 2 shows the SEM image over precursor particles of the sample collected from this example. The particle is spiky with very coarse secondary particles. The BET surface area was only 3.3 m²/g. Such type of product is normally considered not suitable as a precursor for making lithium metal oxide cathode materials.

Example 3 (Reactivation)

Figure 3:
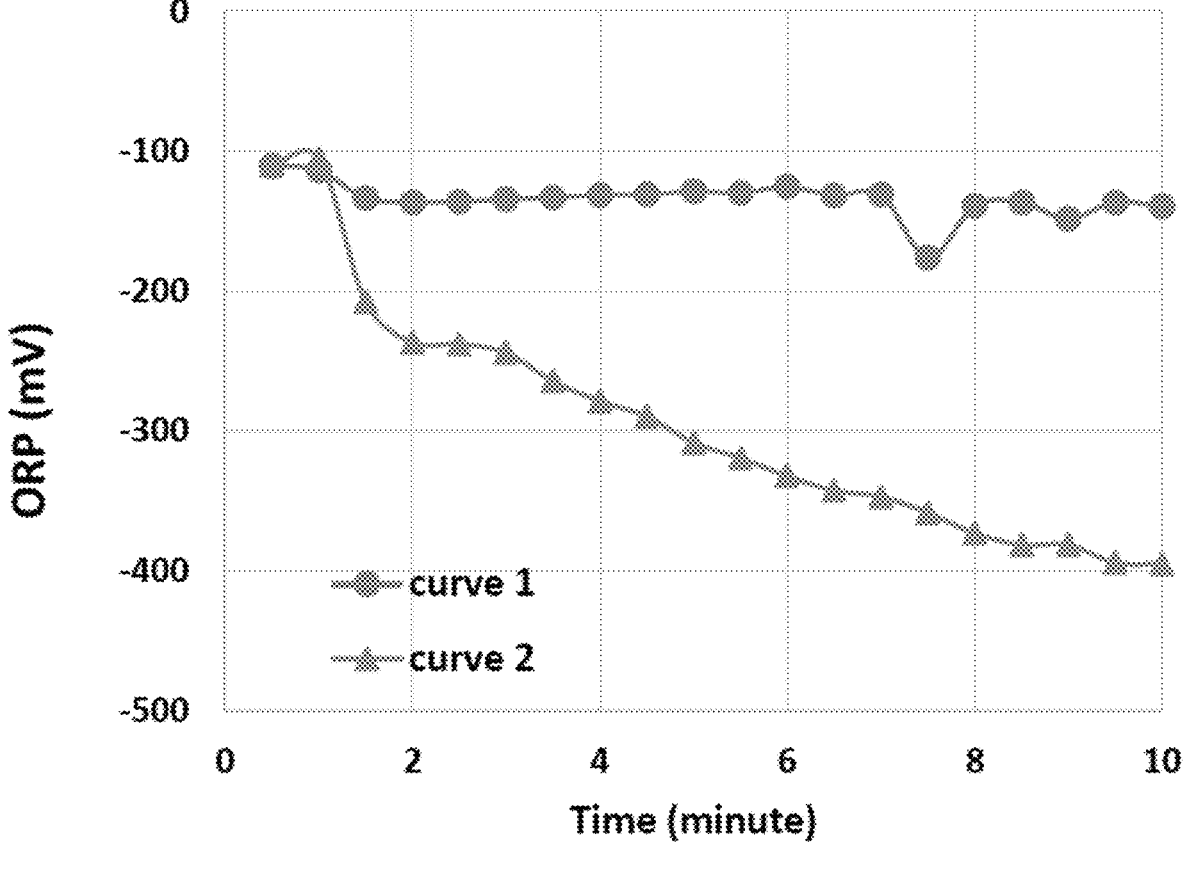
FIG. 3 is a graph of Oxidation-Reduction Potential (ORP) as a function of time for the results of Example 3. This graph illustrates the Oxidation-Reduction Potential (ORP) as a function of time after metal powders were introduced to filtrate, with curve 1 for inactive metal powder, and curve 2 for the same metal powder as in curve 1 but with reactivation treatment by using ammonium nitrate.

About 300 g of unreacted wet metal powders after magnetic separation was taken and exposed to the air for three days. About 100 g of the exposed metal powder was directly introduced to a 3 L vessel with agitation. The vessel contained about 2.5 L of filtrate collected from solid/liquid separation step of the process. The Oxidation Reduction potential (ORP) was measured at different time from the metal powder being introduced. Normally, an ORP below a level of –300 mV indicates the metal is active, and the test result is shown as curve 1 in FIG. 3. The ORP was stable at around –120 mV, with time, which indicated that the metal powder was inactive.

In another test, about 100 g of the same exposed metal powder was introduced into 200 mL 0.1M NH₄NO₃ solution with pH adjusted to about 10.5 by adding ammonia. After stirring for few minutes, the metal powder was transferred into the 3 L vessel with agitation. Again, the vessel contained about 2.5 L filtrate collected from the solid/liquid separation step of the process. The ORP was measured at different times from the metal powder being transferred. The test result is shown as curve 2 in FIG. 3. The ORP was decreased quickly to –400 mV within 10 minutes, which indicated the inactive metal powder was activated.

Thus, it is apparent that there has been provided, in accordance with the present invention, a process, product and battery, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

What is claimed is:

1. A method of producing an isolated cathode active material precursor, comprising:

providing an aqueous solution with a pH of greater than 7;

adding a first metal to the aqueous solution to form a reaction solution;

selecting the first metal from at least one element of nickel, manganese, cobalt, aluminum, and magnesium;

forming a product solution by adding an oxidant and a second metal to the reaction solution, wherein the forming of the product solution further comprises forming a cathode active material precursor comprising the first metal and the second metal;

selecting the second metal from at least two elements of nickel, manganese, cobalt, aluminum, magnesium, zirconium, yttrium, titanium, vanadium, molybdenum and combinations thereof, wherein the selecting of the second metal comprises selecting the first metal other than the selecting of the second metal; and isolating the cathode active material precursor from at least a portion of the product solution and thereby forming a filtrate solution and an isolated cathode active material precursor.

2. The method of claim 1, wherein the forming of the product solution by adding the first metal to the aqueous solution further comprises adding a mixed metal hydroxide to the aqueous solution.

3. The method of claim 1, wherein the providing the aqueous solution further comprises providing the aqueous solution having the pH of about 7.5 to about 13.

4. The method of claim 1, wherein the aqueous solution further comprises an acid selected from the group consisting of sulfuric acid, nitric acid, acetic acid or combinations thereof.

5. The method of claim 1, wherein the aqueous solution further comprises an alkaline material selected from lithium hydroxide, lithium oxide, sodium hydroxide, sodium oxide, potassium hydroxide, potassium oxide, and ammonia.

6. The method of claim 1, wherein the aqueous solution further comprises a conductive salt.

7. The method of claim 6, wherein the conductive salt is selected from the group consisting of a sulfate salt, an acetate salt, a nitrate salt, a chloric salt and combinations thereof.

8. The method of claim 6, wherein the conductive salt comprises a cation selected from the group consisting of sodium, lithium, potassium, ammonium and combinations thereof.

9. The method of claim 1, wherein the aqueous solution further comprises an additional anion.

10. The method of claim 9, wherein the additional anion is selected from the group consisting of borate, bromide, iodide, chloride, sulphate, formate, acetate and combinations thereof.

11. The method of claim 1, wherein the aqueous solution comprises a cation.

12. The method of claim 11, wherein the cation is selected from the group consisting of sodium, potassium, lithium and combinations thereof.

13. The method of claim 1, wherein the aqueous solution further comprises a complexing agent.

14. The method of claim 13, wherein the complexing agent comprises ammonia and ammonium.

15. The method of claim 1, wherein adding the oxidant and the second metal to the reaction solution to form the product solution further comprises adding cathode active material precursor particles to the reaction solution.

16. The method of claim 1, further comprising combining the filtrate solution with the product solution to form additional cathode active material precursor.

17. The method of claim 1, further comprising selecting the oxidant from oxygen, nitric acid and combinations thereof.

18. The method of claim 1, further comprising isolating unreacted metals comprising the first and second metals from the filtrate solution, and treating the unreacted metals with an acid to form additional cathode active material precursor.

19. The method of claim 18, further comprising selecting the acid from nitric acid, ammonia, ammonium and combinations thereof.

20. The method of claim 18, further comprising additionally treating the unreacted metals and selecting the additional treatment from milling, washing, and combinations thereof.

21. A method of forming a cathode active material, comprising:

providing an aqueous solution with a pH of greater than 7;

adding a first metal to the aqueous solution to form a reaction solution;

selecting the first metal from at least one element of nickel, manganese, cobalt, aluminum and magnesium;

forming a product solution by adding an oxidant and a second metal to the reaction solution, wherein the forming of the product solution further comprises forming a cathode active material precursor comprising the first metal and the second metal;

selecting the second metal from at least two elements of nickel, manganese, cobalt, aluminum, magnesium, zirconium, yttrium, titanium, vanadium, molybdenum and combinations thereof, wherein the selecting of the second metal comprises selecting the first metal other than the selecting of the second metal;

isolating the cathode active material precursor from at least a portion of the product solution and thereby forming a filtrate solution and an isolated cathode active material precursor;

forming a final mixture comprising the isolated cathode active material precursor and a lithium containing compound; and calcinating the final mixture thereby forming a calcinated final mixture comprising a cathode active material.

22. The method of claim 21, wherein the final mixture further comprises a dopant.

23. The method of claim 21, wherein the lithium containing compound comprises lithium hydroxide, lithium carbonate, or combinations thereof.

24. The method of claim 21, wherein the calcination is performed at a temperature of about 600° C. to about 1100° C.

25. A method of forming an energy storage device, comprising:

providing an aqueous solution with a pH of greater than 7;

adding a first metal to the aqueous solution to form a reaction solution;

selecting the first metal from at least one element of nickel, manganese, cobalt, aluminum and magnesium;

forming a product solution by adding an oxidant and a second metal to the reaction solution, wherein the forming of the product solution further comprises forming a cathode active material precursor comprising the first metal and the second metal;

selecting the second metal from at least two elements of nickel, manganese, cobalt, aluminum, magnesium, zirconium, yttrium, titanium, vanadium, molybdenum and combinations thereof, wherein the selecting of the second metal comprises selecting the first metal other than the selecting of the second metal;

isolating the cathode active material precursor from at least a portion of the product solution and thereby forming a filtrate solution and an isolated cathode active material precursor;

forming a final mixture comprising the isolated cathode active material precursor and a lithium containing compound;

calcinating the final mixture thereby forming a calcinated final mixture comprising a cathode active material;

forming a cathode, wherein cathode formation comprises depositing the cathode active material on a current collector; and inserting the cathode, an anode and a separator within a housing, wherein the separator is positioned between the anode and the cathode.

\* \* \* \* \*